United States Patent
Kaufman

(10) Patent No.: US 8,387,318 B2
(45) Date of Patent: Mar. 5, 2013

(54) OPEN-AIR PARKING SHELTER WITH PHOTOVOLTAIC ELEMENTS AND IMPROVED AIRFLOW CHARACTERISTICS

(75) Inventor: William E. S. Kaufman, Berkeley Heights, NJ (US)

(73) Assignee: Watts LLC, Millington, NJ (US)

( * ) Notice: Subject to any disclaimer, the term of this patent is extended or adjusted under 35 U.S.C. 154(b) by 630 days.

(21) Appl. No.: 12/537,038

(22) Filed: Aug. 6, 2009

(65) Prior Publication Data
US 2011/0030285 A1 Feb. 10, 2011

(51) Int. Cl.
*E04D 13/18* (2006.01)
*E04H 14/00* (2006.01)
*E04B 1/34* (2006.01)

(52) U.S. Cl. .......................................... 52/173.3; 52/74

(58) Field of Classification Search .................. 52/173.3, 52/73, 74, 75, 78; 136/244
See application file for complete search history.

(56) References Cited

U.S. PATENT DOCUMENTS

| | | | |
|---|---|---|---|
| 3,195,274 A | 7/1965 | Itoh | |
| 4,498,262 A | 2/1985 | Garcia | |
| 5,597,005 A | 1/1997 | Thomas | |
| 6,421,966 B1 * | 7/2002 | Braunstein et al. | 52/173.3 |
| 6,570,084 B2 | 5/2003 | Dinwoodie | |
| 6,631,591 B1 | 10/2003 | Durham | |
| 6,930,237 B2 * | 8/2005 | Mattiuzzo | 136/251 |
| 7,285,719 B2 * | 10/2007 | Conger | 136/245 |
| 7,297,866 B2 | 11/2007 | Aschenbrenner | |
| 7,531,741 B1 | 5/2009 | Melton et al. | |
| 7,614,183 B2 * | 11/2009 | Nomura et al. | 47/65.9 |
| 7,687,706 B2 * | 3/2010 | Conger | 136/245 |
| 7,705,277 B2 * | 4/2010 | Noble et al. | 250/203.4 |
| 2004/0065025 A1 | 4/2004 | Durham | |
| 2005/0109384 A1 * | 5/2005 | Shingleton et al. | 136/244 |
| 2005/0241246 A1 | 11/2005 | Sinha et al. | |
| 2006/0032527 A1 | 2/2006 | Stevens et al. | |
| 2006/0096632 A1 * | 5/2006 | Oswald | 136/251 |
| 2006/0207192 A1 | 9/2006 | Durham | |
| 2008/0010915 A1 | 1/2008 | Liebendorfer | |
| 2008/0034684 A1 * | 2/2008 | Morris et al. | 52/173.3 |
| 2008/0083176 A1 | 4/2008 | Barsun et al. | |
| 2008/0087320 A1 | 4/2008 | Mapes et al. | |
| 2008/0216418 A1 | 9/2008 | Durham | |

(Continued)

FOREIGN PATENT DOCUMENTS

FR 2399518 A1 3/1979

OTHER PUBLICATIONS

Solyndra Products Optimized Photovoltaic Systems for Commercial Rooftops, 2009, obtained from http://www.solyndra.com/Products/Optimized-PV.

(Continued)

*Primary Examiner* — Andrew Triggs
(74) *Attorney, Agent, or Firm* — Pillsbury Winthrop Shaw Pittman, LLP

(57) ABSTRACT

An open-air parking shelter comprises a canopy structure, photovoltaic elements, a power output, and a support structure. The canopy structure comprises a plurality of elongated shading members arranged in spaced apart relation. The spaced apart relation being such that airflow is permitted between the elongated members. The photovoltaic elements are provided on the elongated shading members for receiving solar radiation and converting the solar radiation to electricity. The power output is coupled to each of the photovoltaic elements for outputting the electricity converted by the photovoltaic elements. The support structure is provided for supporting the canopy structure in spaced relation above a ground surface.

24 Claims, 10 Drawing Sheets

U.S. PATENT DOCUMENTS

| | | | |
|---|---|---|---|
| 2009/0031641 | A1 | 2/2009 | Grazioso |
| 2009/0133738 | A1 | 5/2009 | Shiao et al. |
| 2009/0223142 | A1* | 9/2009 | Shingleton et al. ............... 52/71 |
| 2010/0218803 | A1* | 9/2010 | Maltby, Jr. .................. 136/244 |

OTHER PUBLICATIONS

Solyndra Products More Electricity Per Rooftop, 2009, obtained from http://www.solyndra.com/Products/More-Electricity.

Solyndra Products Superior Wind Performance, 2009, obtained from http://www.solyndra.com/Products/Superior-Wind-Performance.

Solyndra Products Hermetically Sealed for Reliability, 2009, obtained from http://www.solyndra.com/Products/Sealed-For-Reliability.

Envision Solar—Solar and Renewable Energy Systems Design—Solar Car Port, 2009, obtained from http://envisionsolar.com/portfolio-services/solar-car-port/.

* cited by examiner

US 8,387,318 B2

OPEN-AIR PARKING SHELTER WITH PHOTOVOLTAIC ELEMENTS AND IMPROVED AIRFLOW CHARACTERISTICS

FIELD OF THE INVENTION

The present invention relates to an open-air parking shelter with photovoltaic elements.

BACKGROUND OF THE INVENTION

Outdoor open-air parking lots cover a significant amount of surface area. Oftentimes, an outdoor parking lot can cover 10 times the surface area of the building(s) which it services. This large, open-air surface area is exposed to massive amounts of solar radiation, and represents a significant opportunity for solar energy generation. As open-air parking lots currently exist, absent being able to charge parking fees, they generally serve as a revenue drain due to construction, maintenance, security lighting and upkeep costs.

The possibility of capturing the solar energy radiating on parking lots creates the possibility of offsetting their expenses, or even making them profit generating, while taking advantage of open-air space that already exists and is exposed to the sun. For example, adjacent buildings could use the generated electricity for its own purposes, thus saving costs that would be paid to a utility company; or some or all of the electricity could be sold to the utility company to generate revenue. Moreover, irrespective of the potential financial benefits, the ability to take advantage of this open-air space to generate electricity by solar cell technology is entirely environmentally positive. Specifically, the electricity generated will have no carbon emissions, and takes advantage of open-air space that already exists, thus avoiding intrusion into undeveloped areas, which is often the case with large solar cell farms.

Others have previously attempted to create parking shelters with solar cell technology to capture solar energy radiating onto an open-air parking lot. For example, see U.S. Pat. Nos. 7,285,719, and 7,531,741, and U.S. Patent Publication Nos. 2004/0065025 A1 and 2006/0207192 A1, each of which is incorporated herein by reference. Also, examples of other such structures are available from Envision Solar (see, www.envision.com/portfolio-services/solar-car-port). However, none of these approaches have seen wide-scale commercial adoption. These each have significant shortcomings. In particular, these designs use large flat canopy structures for supporting a large array of rigid solar panels. While this may effectively provide the solar energy generating functionality, such structures are poorly suited for use in an exposed outdoor environment. Specifically, such large flat canopy structures can create a significant amount of lift or downward force under high wind conditions. As such, the support structure and associated connections must be overdesigned to ensure sufficient stability and strength to withstand such forces. Also, in Northern regions, snow or ice may gather on these structures, significantly adding to their weight (these roof structures are also typically oriented at a specific angle to the sun creating limitations and concentrating water run-off to one end of the structure where it needs to be captured and diverted). This results in a structure that is significantly more expensive, and may also be aesthetically unsightly.

Accordingly, the present inventor has recognized a long-felt but unresolved need for an improved open-air parking shelter that functions to effectively capture solar radiation for conversion to electricity, yet has a structural design that better manages airflow due to high winds and prevents the accumulation of precipitation.

SUMMARY OF THE INVENTION

One aspect of the invention provides open-air parking shelter comprising a canopy structure, photovoltaic elements, a power output, and a support structure. The canopy structure comprises a plurality of elongated shading members arranged in spaced apart relation. The spaced apart relation permits airflow between the elongated members. The photovoltaic elements are provided on the elongated shading members for receiving solar radiation and converting the solar radiation to electricity. The power output is coupled to each of the photovoltaic elements for outputting the electricity converted by the photovoltaic elements. The support structure is provided for supporting the canopy structure in spaced relation above a ground surface.

Other objects, features, and advantages of the present invention will become apparent from the following detailed description, the appended claims, and the accompanying drawings.

DETAILED DESCRIPTION OF THE ILLUSTRATED EMBODIMENT(S) OF THE INVENTION

The present application discloses an open-air parking shelter 10 with integrated solar cell photovoltaic technology. The illustrated embodiment is not intended to be limiting, and the shelter 10 may have other configurations, constructions, and materials other than those mentioned below.

As used herein the term "open-air parking shelter" refers to a parking shelter for use in an open-air parking lot, i.e., a parking lot that is outdoors and exposed to the environment, including radiation from the sun. This excludes constructed parking garages, except to the extent that an exposed roof level of a parking garage may be considered an open-air parking lot; the levels below the roof level would not be regarded as open-air because the roof covers them and precludes direct exposure to the sun.

The basic components of the parking shelter 10 are a canopy structure 12 and a support structure 14. The canopy structure 12 functions to shade the parking area underneath it, and the support structure 14 functions to support the canopy structure 12 in spaced relation above the parking area. Preferably, the canopy structure 12 should be spaced a sufficient amount to enable conventional motor vehicles (cars, pick-up trucks, etc.) to park beneath it without obstruction. For example, the canopy structure 12 may be spaced at least 7 feet above the ground surface, and preferably 7.5 feet, 8 feet or 8.5 feet. Other heights may be used.

Figure 1:
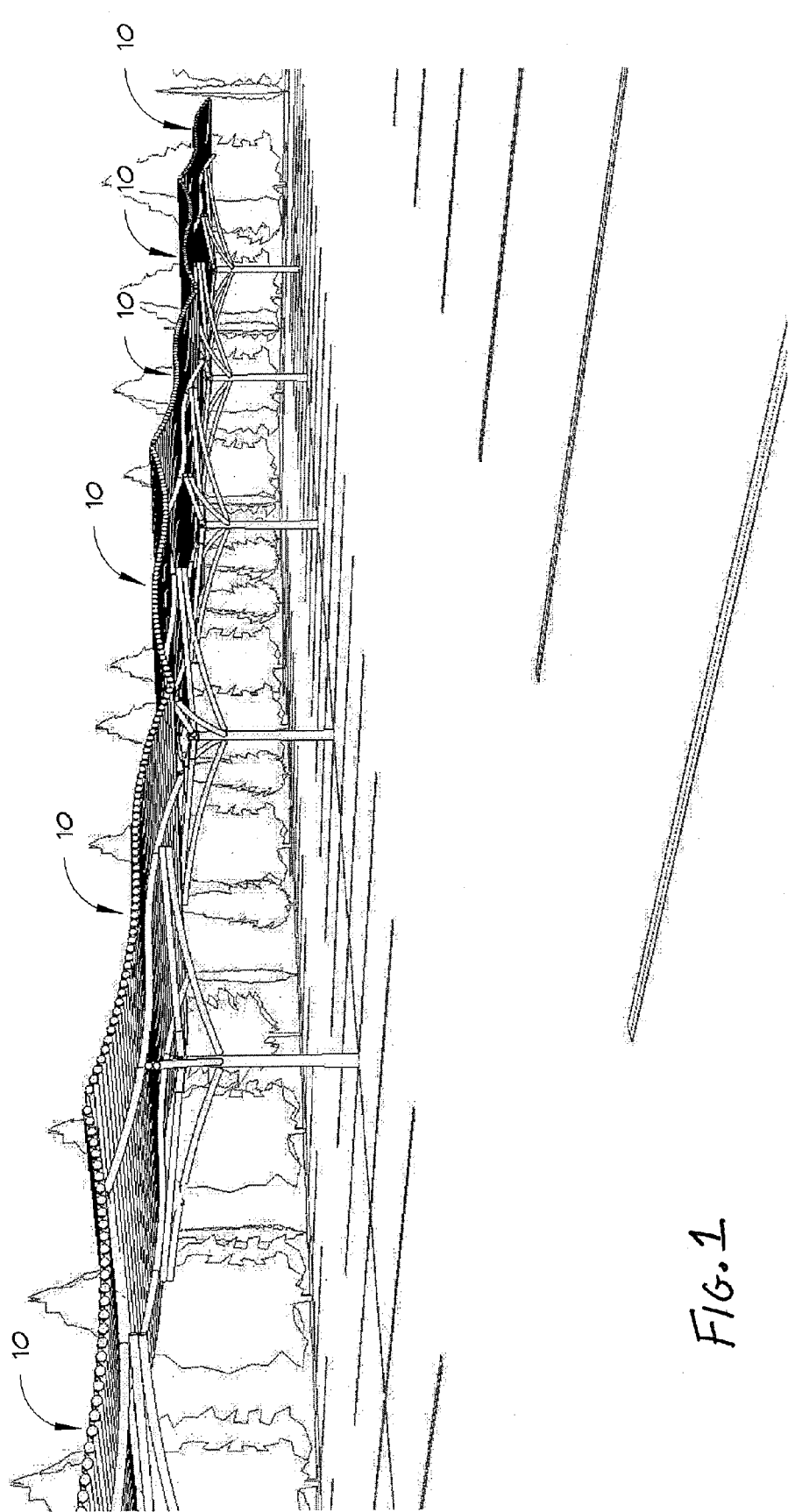
FIG. 1 is a perspective view of a series of open-air parking shelters, each constructed in accordance with the present invention, installed in a parking lot.
Figure 2:
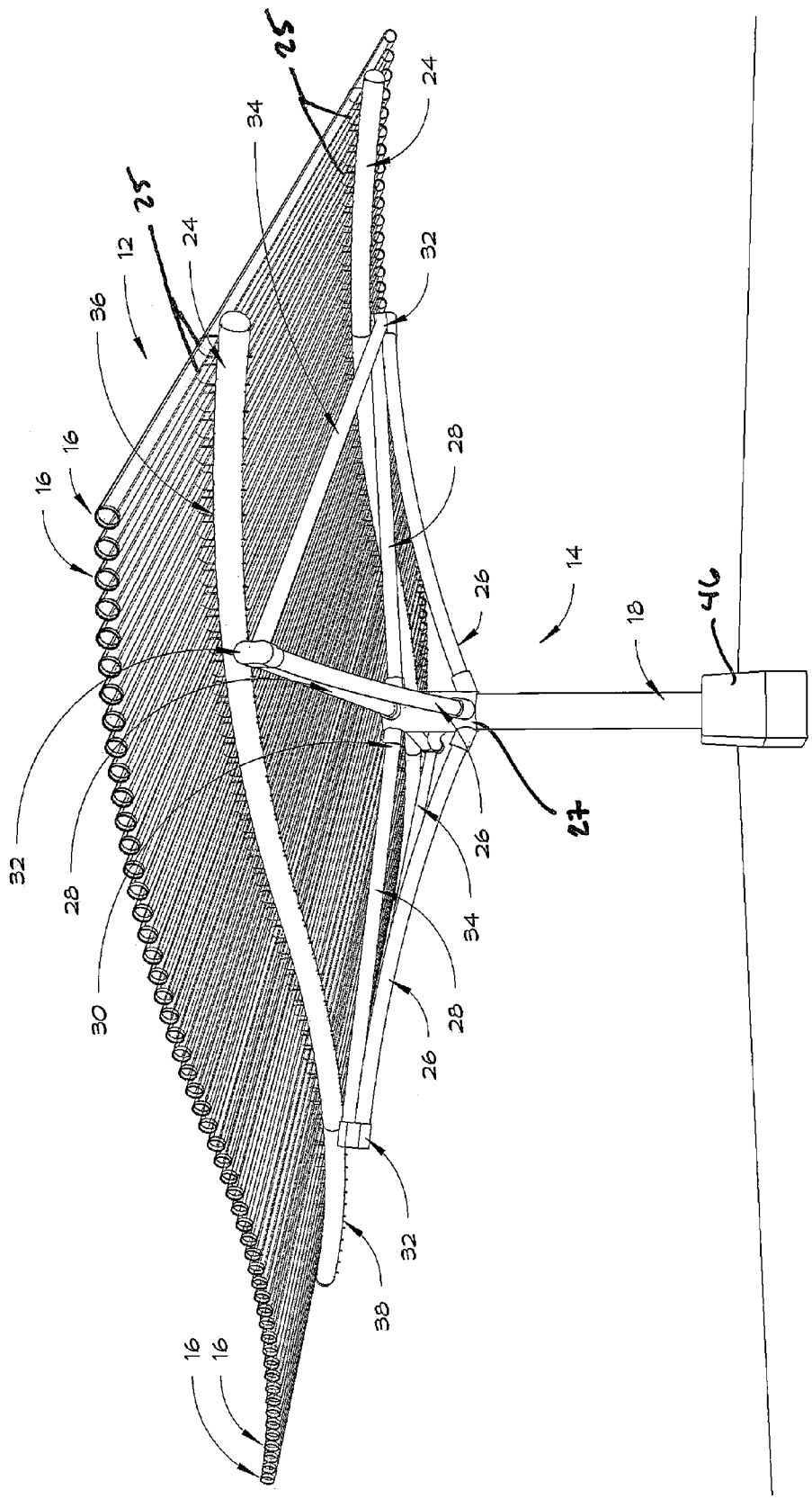
FIG. 2 is a perspective view, taken from a lower angle, showing one of the parking shelters of FIG. 1.
Figure 7:
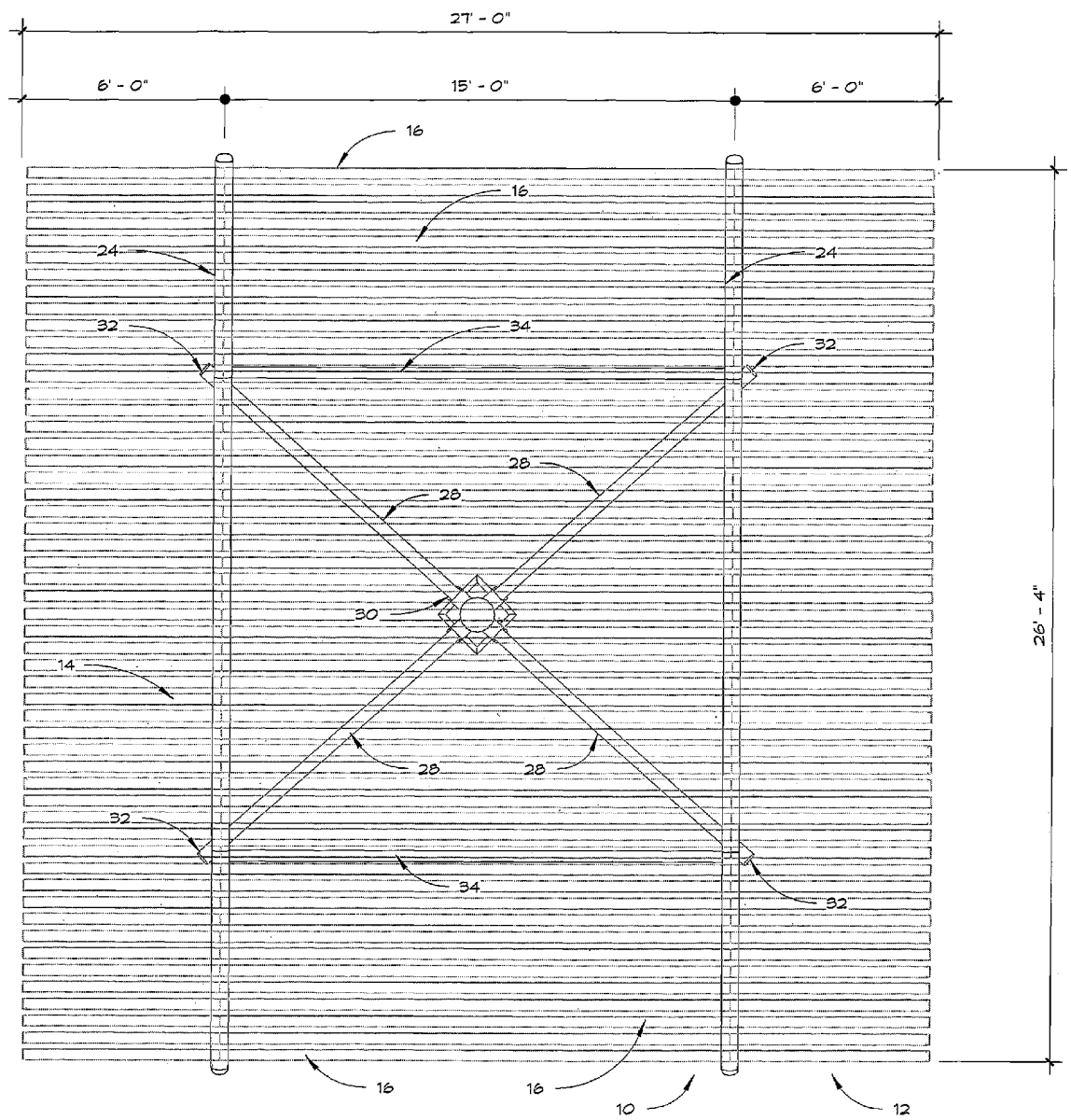
FIG. 7 is a top plan view of the parking shelter of FIG. 2, with the elongated shading members shown in phantom so the support structure thereunder can be seen.

As can be appreciated from FIGS. 1, 2, and 7, the canopy structure 12 may have an overall generally rectangular configuration, and may be wide enough and long enough to cover six conventional parking spaces in a 2 by 3 array. The typical parking lot can be seen in FIG. 1 and has parallel rows of parking spaces delineated by painted lines. Typically, the rows are arranged in parallel groups of two back to back, with wide driving areas or lanes for permitting vehicles to drive between adjacent groups. For example, the canopy structure 12 may have a width of 26 feet, 4 inches, and a length of 27 feet. These measurements are examples only and are not intended to be limiting. The support structure 14 is located in the center such that it extends vertically in the area where the two middle parking spaces meet, thus allowing free, unobstructed access to all 6 parking spaces. This illustrated configuration, however, is not intended to be limiting, and the shelter 10 may take other configurations, including using a support structure with multiple vertical pillars or a configuration providing coverage for more than or fewer than 6 parking spaces.

Figure 9:
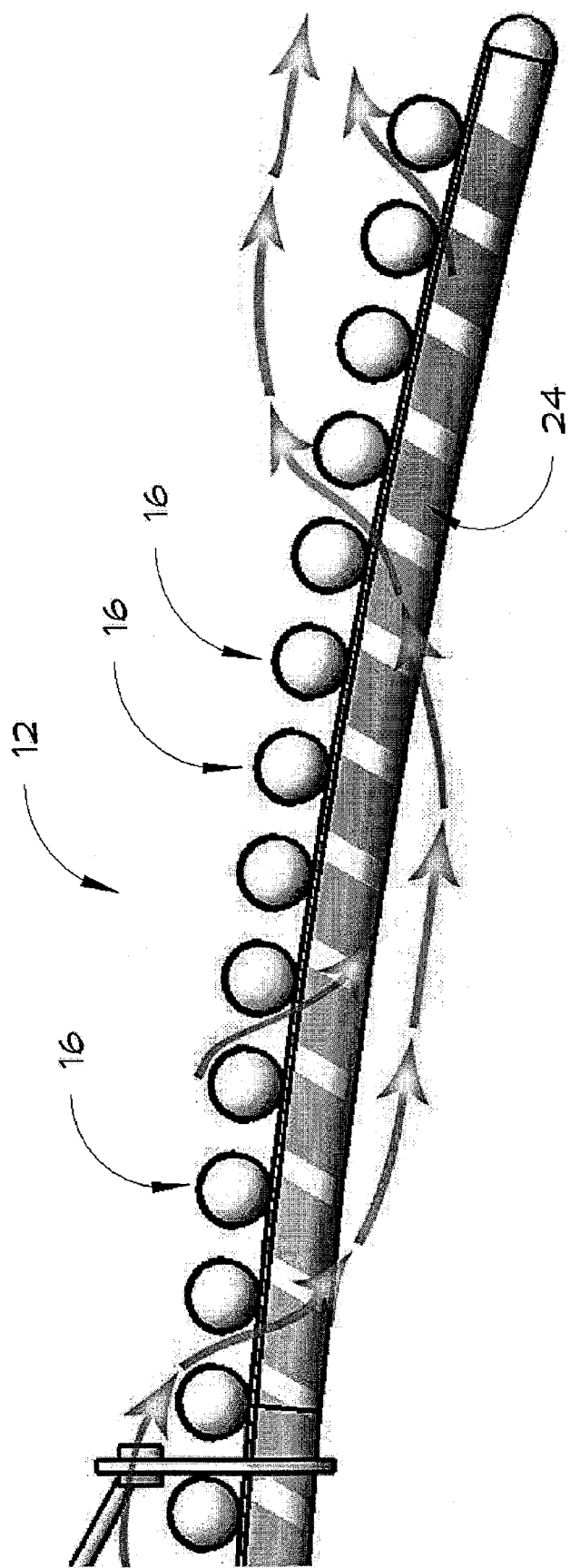
FIG. 9 is close-up view of the canopy structure showing airflow patterns therethrough.

The canopy structure 12 comprises a plurality of elongated shading members 16 arranged in spaced apart relation. As can be seen in the detailed view of FIG. 9, the spaced apart relation permits airflow between the elongated members 16. That is, because the members 16 are spaced apart from one another, wind blowing over the members 16 can flow through the spaces therebetween. This minimizes any lift or downward force generated by airflow over the canopy structure 12, as may occur with solid panel canopy structures. Likewise, snow or water will fall through the open spaces, thus eliminating or minimizing the accumulation of snow and ice (or other precipitation, such as hail) in cold conditions. The specific construction and arrangement of the elongated shading members 16 will be discussed in further detail below.

In the illustrated embodiment, the support structure 14 comprises a vertical pillar 18 extending vertically below the central region of the canopy structure 12. The vertical pillar 18 shown is a single pole, which may be either tubular or solid. In other embodiments, the pillar 18 may be comprised of multiple elements, and the illustrated construction is not intended to be limiting.

A ground anchor 20 or footing is provided, and is configured to be embedded into the ground for providing a stable mounting point. In the illustrated embodiment, the ground anchor 20 is an elongated member with one or more external threads 22 along its length. The anchor 20 is embedded into the ground by forcing it downwardly and rotating it, thus causing the external thread(s) 22 to work in a manner similar to a screw for securing the anchor 20 into the ground. Other types of ground anchors may be used, including others that have configurations suited for specific ground conditions. Also, pre-existing utility or light pole foundations may be used when retro-fitting existing parking lots. Thus, the illustrated embodiment is not intended to be limiting.

In the illustrated embodiment, the elongated shading members 16 extend parallel to one another, as can be appreciated from the various Figures. As an option, the support structure 14 further comprises at least one transverse support beam 24 extending perpendicularly to the elongated shading members 16. The elongated shading members 16 are mounted to the at least one transverse support beam 24, and the transverse support beam 24 is supported by the vertical pillar 18. Preferably, as is shown in the illustrated embodiment, the at least one transverse support beam 24 includes a pair of the transverse support beams 24 spaced apart from one another, and the elongated shading members 16 are mounted to each of the pair of transverse support beams 24. Each of the transverse support beams 24 is supported by the vertical pillar 18.

As can be seen, a plurality of clamps 25, or other fasteners such as ties, straps, bolts, weldings, adhesives, etc., may be used to secure the elongated members 16 to transverse support beams 24.

The illustrated embodiment of the support structure 14 further comprises a plurality of radial support arms 26. Each radial support arm 26 is connected at an inner end to a portion of the vertical pillar 18, and at an outer end to a portion of an associated one of the transverse support beams 24. The radial support arms 26 may extend downwardly at an angle, as illustrated, so that the inner ends of the radial support arms 26 connect to the vertical pillar 18 at a portion that is spaced below its upper end. The connection between the inner ends of the radial support arms 26 and this intermediate portion of the vertical pillar 18 may be established by any suitable mechanical coupling, such as bracket 27. This configuration is designed for efficient transfer of the load of the canopy structure 12 to the vertical pillar 18.

As an option, additional upper radial support arms 28 may be used in the support structure 14. Thus, radial support arms 26 are shown as lower radial support arms. Each upper radial support arm 26 is connected at an inner end to a top portion of the vertical pillar 18, and at an outer end to a portion of an associated one of the transverse support beams 24. In the illustrated embodiment, a cross-shaped bracket 30 may mounted to the top end of the vertical pillar 18, with four receptacles for receiving the inner ends of the upper radial support arms 28. Preferably, as illustrated, the outer ends of associated pairs of the upper and lower radial support arms 26, 28 are joined together for connection to the same portion of the associated one of the transverse support beams 24. This connection may be established by a coupling, such as brackets 32. With this construction, the upper radial support arms 28 function to prevent displacement of the lower radial support arms 26 in the downward direction. Other constructions or configurations may be used, and this is not intended to be limiting.

Preferably, but not necessarily, the brackets 27 and 30 share a common center tube that slides onto the vertical pillar 18, as illustrated. Thus, each of parts 27 and 30 could be described as bracket portions of the larger combined bracket. Separate brackets may also be used.

For additional support, a pair of horizontal beams 34 may be connected between the brackets 32. These horizontal beams 34 are connected to the brackets 32, and thus are joined to the outer ends of the pairs of upper and lower radial support arms 26, 28. This prevents the outer ends of adjacent pairs of the radial support arms 26, 28 from spreading outwardly apart from one another.

Figure 3:
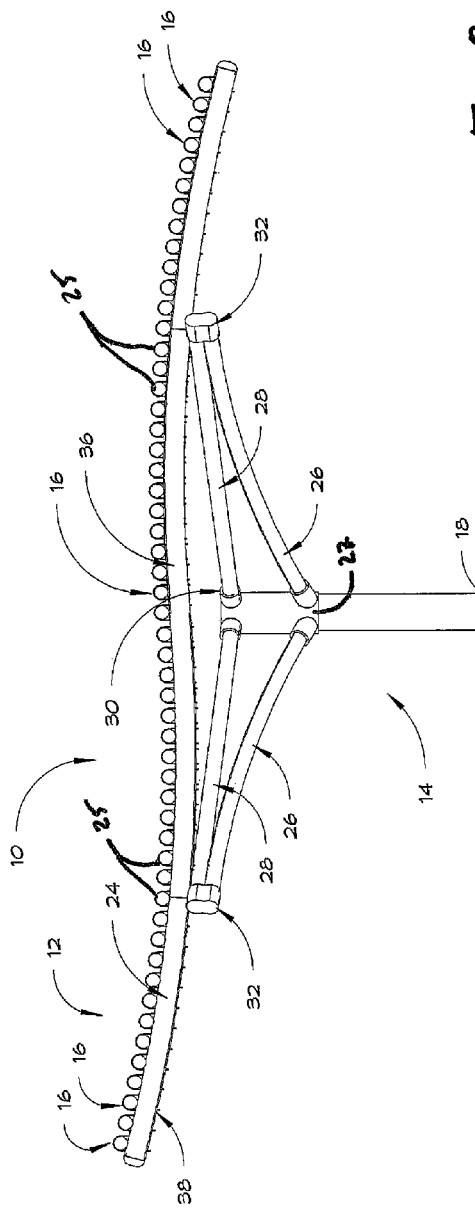
FIG. 3 is a front elevational view of the parking shelter of FIG. 2, the rear elevational view being a mirror image thereof.
Figure 4:
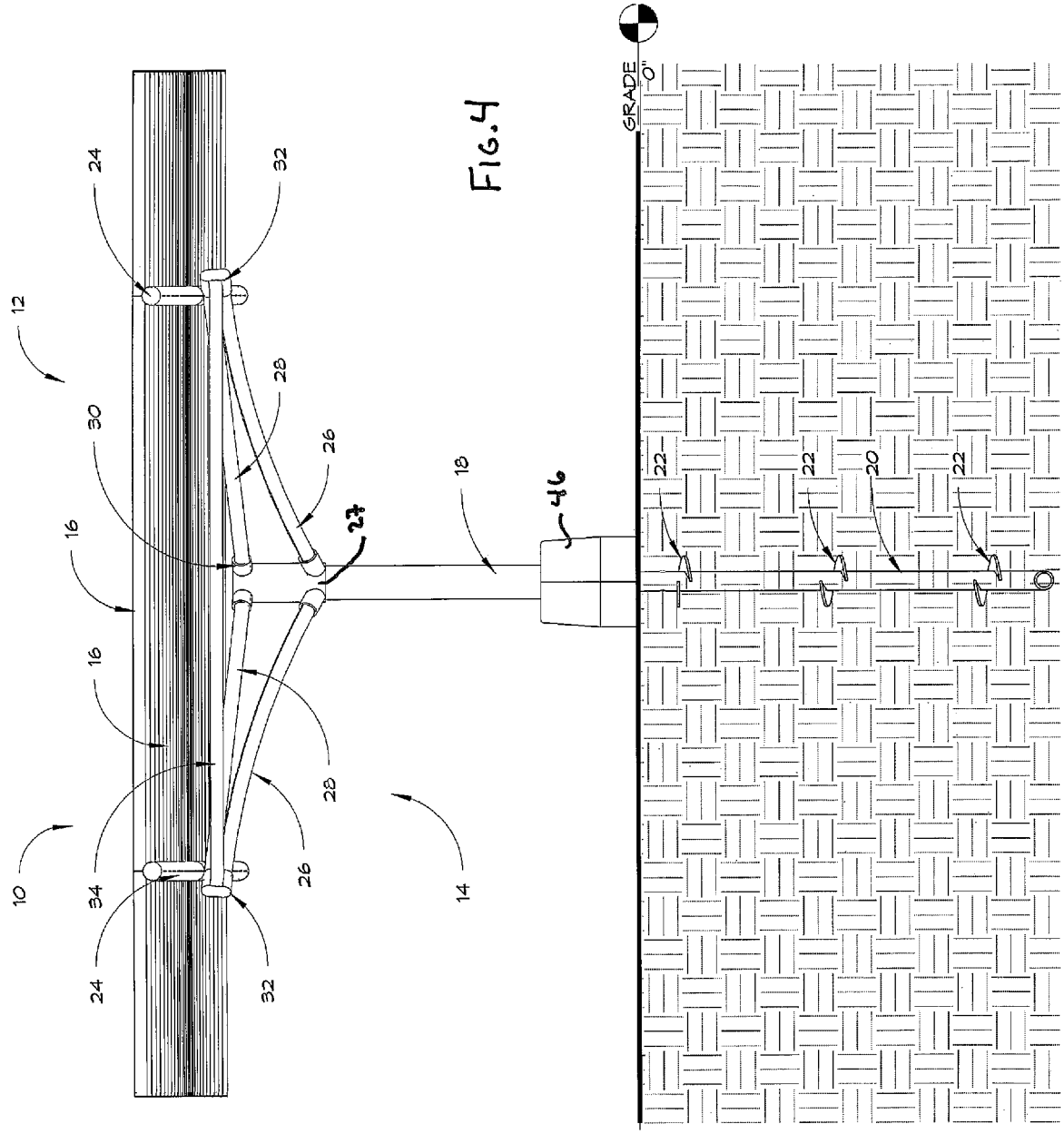
FIG. 4 is a side profile view of the parking shelter of FIG. 2 from one side thereof.
Figure 5:
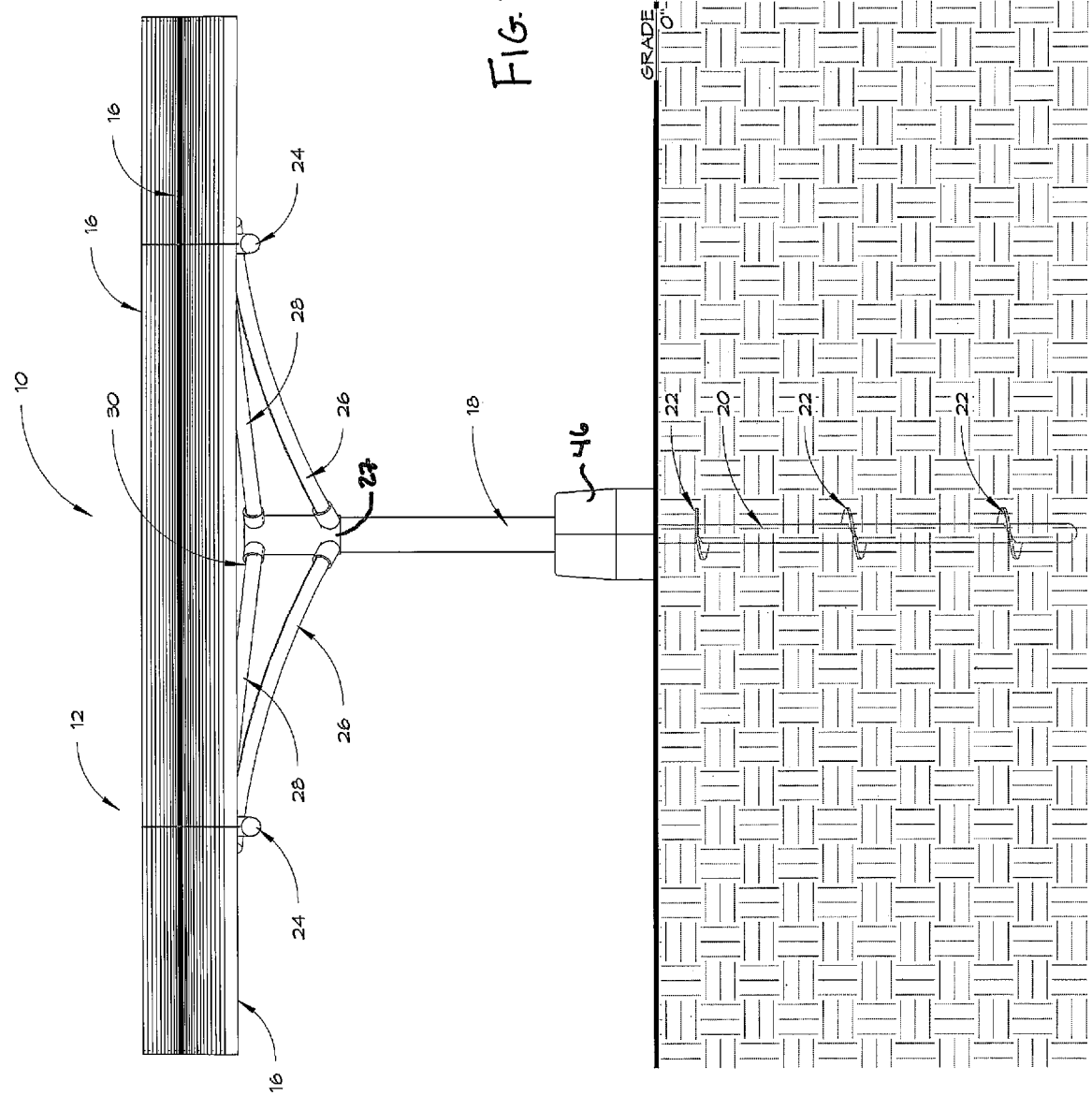
FIG. 5 is a side profile view of the parking shelter of FIG. 2 from the other side thereof.
Figure 6:
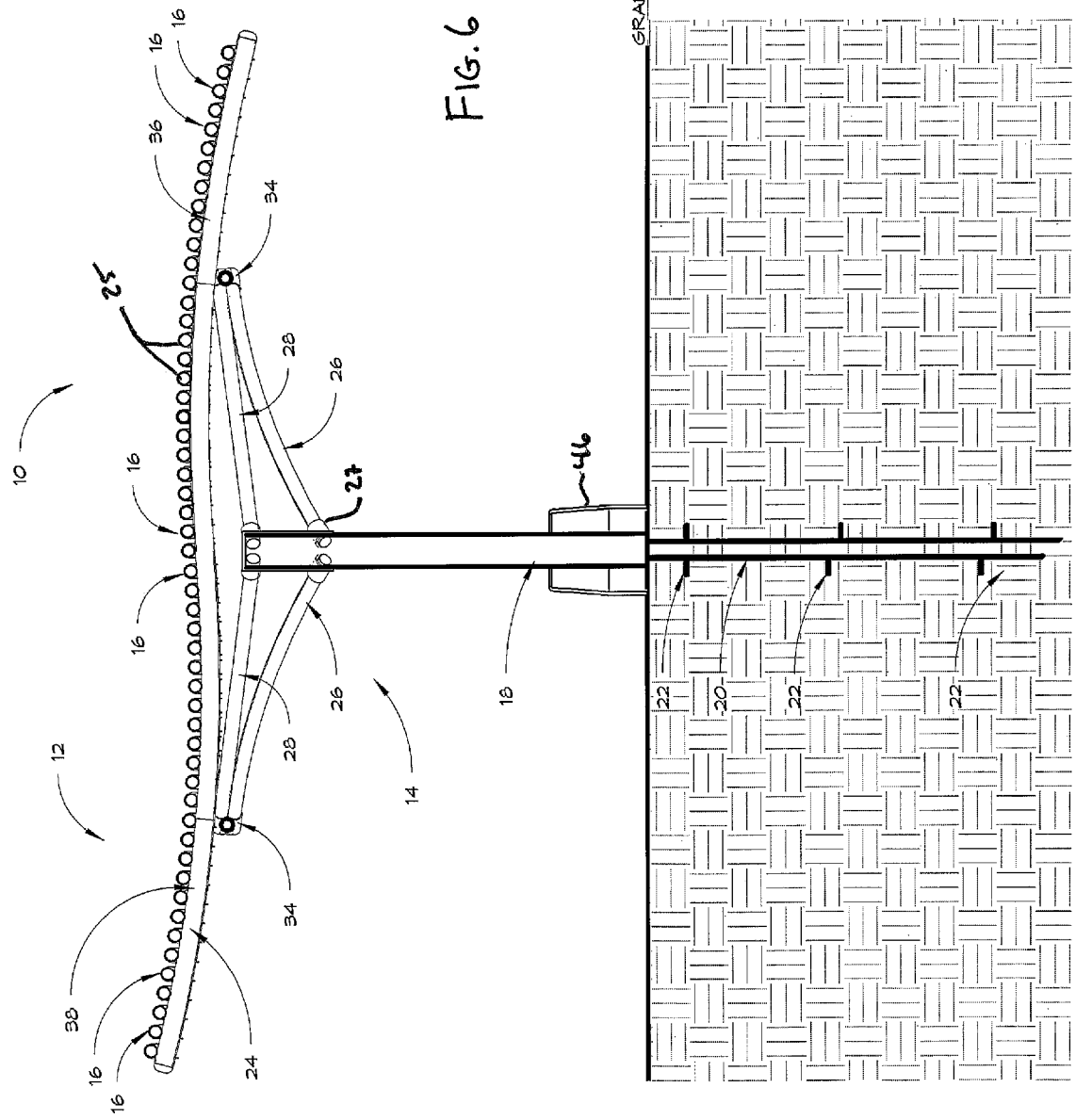
FIG. 6 is a cross-sectional view of the parking shelter of FIG. 2, taken vertically along through the center thereof and from side to side.

As can be seen, for example, in the front elevational view of FIG. 3, each transverse support beam 24 has an undulated configuration. As can be seen, the undulated configuration of each transverse support beam 24 has a downwardly facing concave portion 36 and an upwardly facing concave portion 38.

The transverse support beams 24 may be secured to the support arms 28 and/or support arms 26 by any suitable fasteners, such as clamps, straps, ties, bolts, weldings, adhesives, etc. The attachment may be on or to the brackets 32 at the ends of arms 26, 28.

Thus, this support structure 14 is designed to support the parking shelter 10 in a free-standing manner. Each component of the support structure 14 may be formed of any suitable load bearing material, such as aluminum, stainless steel, composite materials, plastics, etc. Preferably, the various beams are hollow tubes for maximizing strength without increased weight, but solid members may be used also. The illustrated embodiment is not intended to be limiting, and other constructions, configurations and materials may be used. For example, the vertical pillar 18 could have its upper end extending above the canopy structure 12, and the support structure 14 could include suspension cables or rigid beams attached to various points on the canopy structure 12 for providing support.

With the canopy structure 12 permitting airflow among the shading members 16, the support structure 14 need not be designed to support the higher loads that are generated when a flat, solid canopy structure 12 of similar size is used. The result is that the support structure 14 may be made less expensively and more design flexibility is permitted. Also, the support structure 14 may be capable of supporting a canopy structure of larger area for providing increased coverage over more parking spaces. For example, as can be appreciated from the Figures, the support structure 14 supports a large canopy structure 12 from the center thereof for coverage of six standard parking spaces, with no support structure obstructing the periphery. This minimizes the amount of support structure used per parking space, which makes not only parking easier, but also makes maintenance (sweeping, plowing, etc.) easier.

Turning now to the solar cell functionality of the shelter 10, photovoltaic elements 40 are provided on the elongated shading members 16, and preferably each of them, for receiving solar radiation and converting the solar radiation to electricity. The manner in which the photovoltaics function to convert solar radiation to electricity is known and need not be detailed herein. By providing photovoltaic elements 40, the parking shelter 10 can serve the dual purposes of both shading vehicles parked below it and generating electricity, thus taking advantage of otherwise inactive surface area that has continual, daily exposure to the sun.

Figure 8:
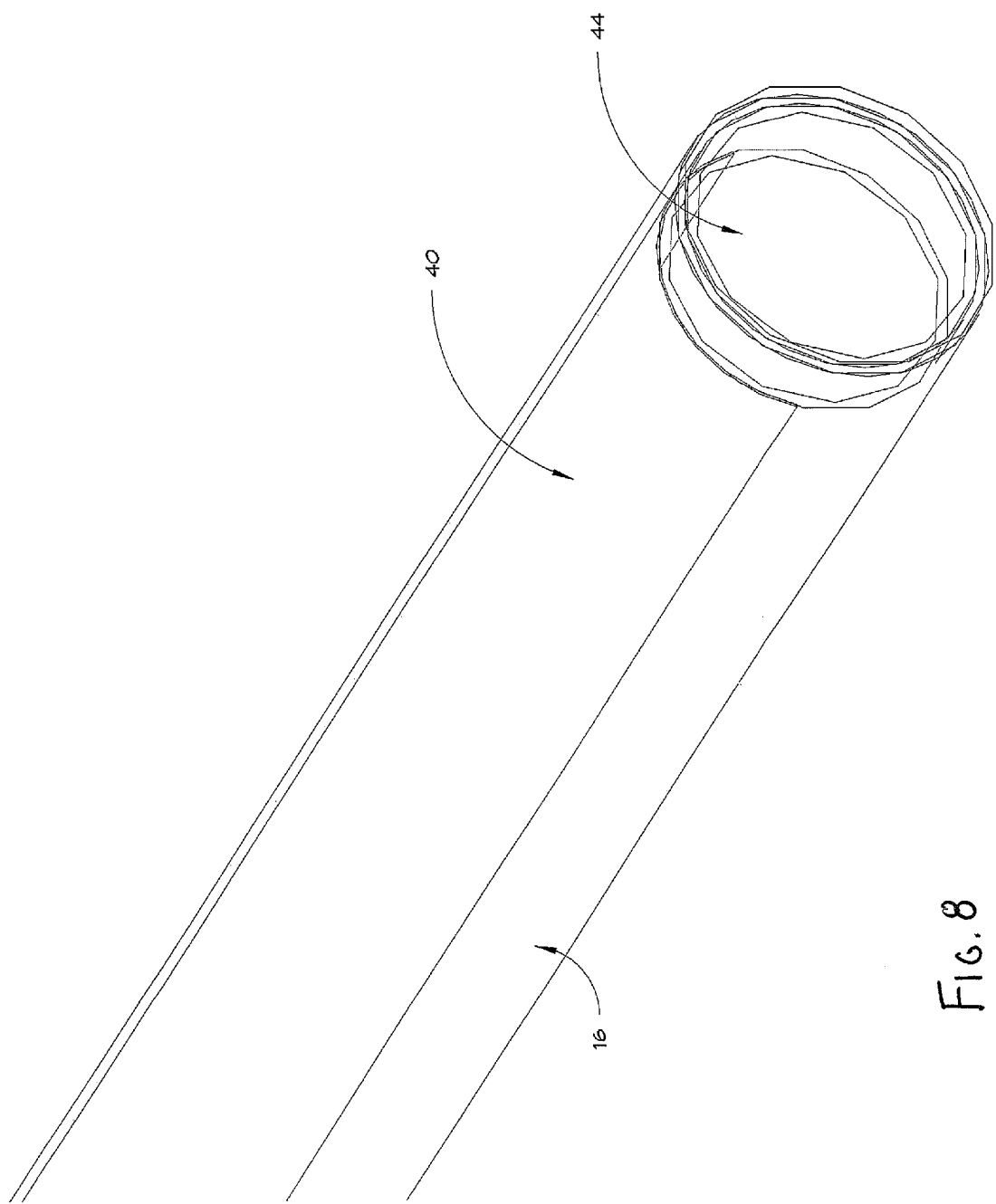
FIG. 8 is a perspective close-up view of part of an elongated shading member of the parking shelter of FIG. 2.
Figure 10A:
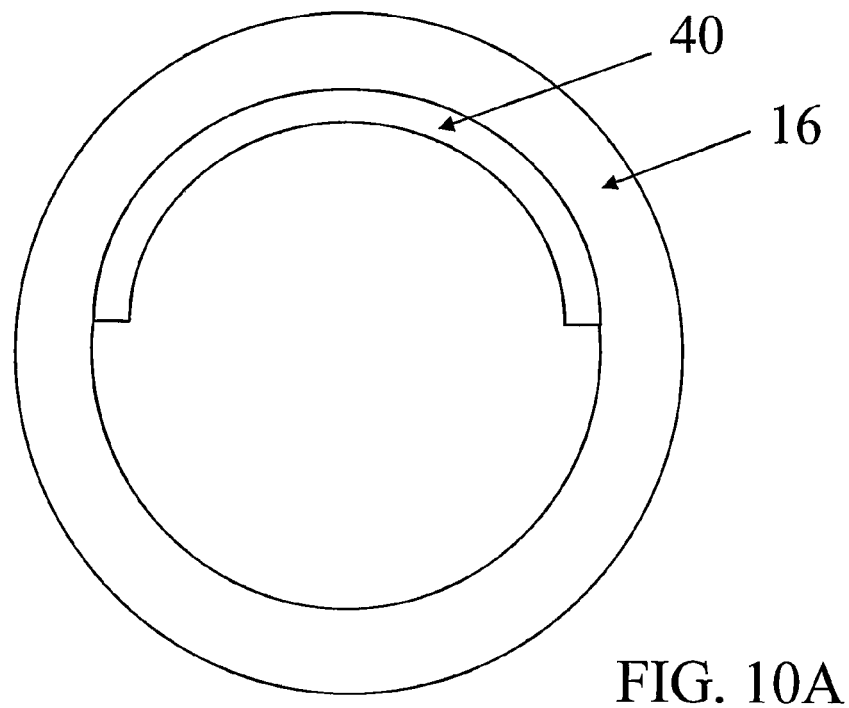
FIG. 10A is a schematic cross sectional view of the elongated shading member of FIG. 8.

In the illustrated embodiment, the elongated shading members 16 are hollow tubes formed of a transparent material, such as optical grade polycarbonate, as can be seen in FIGS. 8 and 10A. The photovoltaic elements 40 may be received inside the elongated shading members 16. Because the shading members 16 are made of a transparent material, solar radiation can shine through the material and onto the photovoltaic elements 40 therein. Also, because the photovoltaic elements 40 are inside the elongated shading members 16, they are protected from exposure to rain, snow, bird droppings, etc. Even though the shading members 16 are made of transparent material, the presence of the photovoltaic elements 40 will block the sunlight to provide the shading function.

In an embodiment, the photovoltaic elements 40 are thin films applied to upper interior surfaces of the elongated shading members 16. The film used may be a CIGS film, which refers to the materials providing the film with its photovoltaic characteristic: copper-indium-gallium-diselenide. Such films are known in the solar cell industry, and are available from, for example, Global Solar Energy, Inc., 8500 South Rita Road, Tucson, Ariz., 85747, USA. Preferably, the film may be applied so that it covers the upper ⅓ or ½ of the interior of its shading member 16 and extends along its entire length. The tubular shape of the members 16 may be circular, elliptical or otherwise. With this configuration and location of the photovoltaic film elements 40, the parking shelter 10 may preferably, but not necessarily, be oriented so that the elongated shading members 16 run north to south, thus allowing the curvature of the film to run in the east to west direction. This allows the sun to impinge directly on the photovoltaic film elements 40 over a wider range of angles, thus keeping its energy output more consistent as the sun travels across the sky in its east to west path.

The photovoltaic films 40 may be adhered to the upper interior surfaces of the members 16 by any suitable adhesive. If the adhesive is between the film 40 and the interior surface of the member 16, the adhesive is preferably light transmissive, so as to enable the maximum amount of light transmittance to occur onto the photovoltaic film 40. Typically, the film 40 has an opaque backing, which blocks sunlight to thus provide the shading function of the shading members. The backing may also be larger than the active photovoltaics so that the bonding may be at the edge of the backing, thus avoiding any adhesive between the active photovoltaics and the member's interior surface. Also, the backing itself may have an adherent quality, and may bond to the member 16 surface, such as by heating, without use of a separate adhesive.

The film 40 may be applied by mounting the film 40 over an expandable bladder. In some embodiments, the film backing may be tubular, with the photovoltaic active element covering its upper ⅓ to ½. The bladder is inserted into the member 16 and expanded to press the film 40 into contact with the interior surface of the member 16. Optionally, the bladder may be heated, such as to approximately 150° C. to promote the bonding between the film's backing and the member's interior surface. After deflating and removing the bladder, a vacuum is applied to the member 16 to remove any moisture, and the member 16 is sealed by end caps 44. A dessicant, possibly one in a container with a passive check valve, may be used in each member 16 to remove any moisture that may subsequently develop in the member 16. The heating by the sun may increase pressure in the member 16 to open the check valve, thus enabling the dessicant to absorb any moisture in the member 16.

As an optional feature, reflective elements (not shown) may also be received in the elongated shading members 16. These may be used in the event the film 40 is bi-directional, meaning it can receive solar radiation from either side, or two films 40 are applied to opposing sides of a common opaque backing (a double-sided construction). These reflective elements may be used to reflect solar radiation upwardly towards the photovoltaic elements 40. Such reflective elements would be provided on lower interior surfaces of the elongated shading members 16. The reflective elements may be thin mirrored films applied to the lower interior surfaces of the elongated shading members 16. The reflective films may, for example, be adhered to the lower interior surfaces of the elongated shading members 16 by any suitable adhesive.

The reflective film may be applied to the lower ⅓ of the elongated member's interior surface, and the same technique for film 40 may be used. A pair of lateral gaps may be provided between the lower edges of the photovoltaic film 40 and the upper edges of the reflective film. These gaps permit solar radiation to shine into the shading member 16 at an angle for reflection off the reflective film and upwardly to the underside of the photovoltaic film 40. If the photovoltaic film 40 used is bi-directional the solar radiation that would otherwise miss the photovoltaic film 40 may be reflected onto the photovoltaic film 40 by the reflective film, thus increasing the overall energy capturing potential of each elongated shading member 16.

The photovoltaic film 40 and reflective film described herein are examples only and are not intended to be limiting. Other structures with photovoltaic or reflective characteristics, respectively, may be used. For example, rigid insert elements may be used instead of films.

Figure 10B:
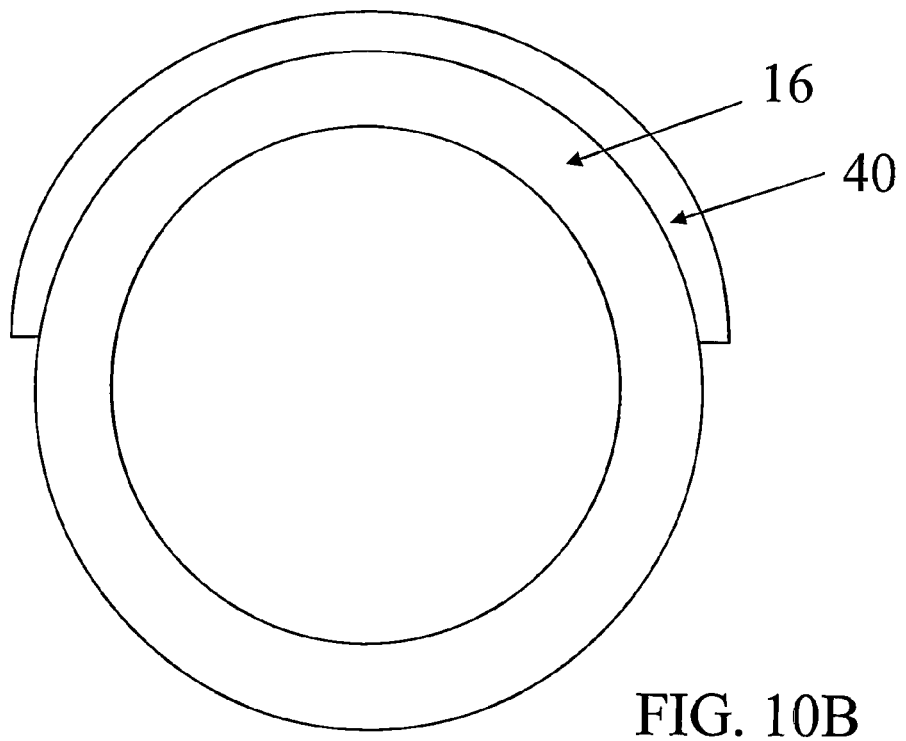
FIG. 10B is a schematic cross sectional view of another embodiment of the elongated shading member.

In an alternative embodiment, such as that illustrated in FIG. 10B, the photovoltaic elements 40 may be provided on at least upper exterior surfaces of the elongated shading members 16, as opposed to the upper interior surfaces. In this alternative embodiment, the photovoltaic elements 40 may also be films, which may be applied over the upper ⅓ to ½ (or more) of the upper exterior surfaces of the elongated shading members 16. If a bi-directional film 40 is used, a reflective film or member may be provided on the lower interior or exterior surfaces of the elongated shading member 16 so as to reflect additional solar radiation back upwardly towards the undersides of the photovoltaic elements 40. To protect the photovoltaic film 40, a protective transparent laminate may be adhered over the photovoltaic film 40, such as by using a light transmissive adhesive.

With any embodiment, a power output 46 is coupled to each of the photovoltaic elements 40 for outputting the electricity converted by the photovoltaic elements 40. This power output 46 may be any suitable device for collecting the electricity and distributing the same to a larger network or grid. For example, the power output 46 may be an inverter, which is a standard piece of equipment used to convert the DC electrical signal generated by photovoltaic elements into an AC signal that is compatible for use with standard power grids. As another alternative, the power output could simply output a DC signal, and as an option a common inverter may receive DC signals from a large number of parking shelters 10 and convert them to an AC signal. The power output 46 may be located at the base of the vertical pillar 18 as illustrated, and wires (not shown) may be routed underground to connect the output 46, such as, for example, a common output for a plurality of the devices 10.

The power output 46 may couple to an energy storage device, such as a rechargeable battery, so that the energy generated may be stored for later use. This is particularly beneficial because the photovoltaic cells power generation does not function at night, and may be interrupted for long or short periods during the day. The use of an energy storage device allows for continued output of electricity, even when demand for the electricity does not coincide with the power generation of the photovoltaic cells. The electricity generated by the photovoltaic cells may be used by adjacent buildings or other devices (such as lights for the parking lot) or may be sold to the local power grid to generate revenue.

The individual photovoltaic elements 40 may be coupled in series, parallel, or a combination of both. As an example, the photovoltaic elements 40 may be arranged with their terminals in an alternating manner. That is, each of the "odd" photovoltaic elements 40 (i.e., starting from one end, the first, the third, the fifth, etc.) may have its positive terminal at a first end of its member 16 and its negative terminal at the opposite second, and each of the "even" photovoltaic elements 40 may have its negative terminal at the first end of its member 16 and its positive terminal at the second end. The positive and negative terminals at each pair of adjacent ends in the series sequence may be connected by wiring extending through a sealed port in each adjacent end cap 44.

Thus, choosing the $7^{th}$ photovoltaic arbitrarily, it may have its positive terminal at the first end, and its negative terminal at its second end; the $6^{th}$ and $8^{th}$ photovoltaic elements 40 would thus have their positive terminals at the second ends and their negative terminals at their first ends. Wiring extending through sealed ports on the end caps 44 at the first ends of the $6^{th}$ and $7^{th}$ members 16 may connect the negative terminal of the $6^{th}$ photovoltaic element 40 to the positive terminal of the $7^{th}$ photovoltaic element 40, and wiring extending through sealed ports on the end caps 44 at the second ends of the $7^{th}$ and $8^{th}$ members 16 may connect the negative terminal of the $7^{th}$ photovoltaic element 40 to the positive terminal of the $8^{th}$ photovoltaic element 40.

As can be appreciated, this alternating sequence may be used to connect all the photovoltaic elements 40 in series. The ultimate terminals on the first and last photovoltaic elements 40 (one of which is positive, and the other of which is negative) may be connected to the power output 46. For example, wiring connected to these terminals through sealed ports on the associated end caps 44 may be routed to the power output 46, such as along one or both of members 24 and then downwardly in or along the vertical pillar 18 for less visibility.

Connecting all the photovoltaic elements 40 in series maximizes the potential or voltage. It is also possible to connect the photovoltaic elements 40 in parallel, which maximizes current output. For parallel connections, the terminals of the photovoltaic elements 40 would preferably be arranged in the same orientation (i.e., not alternating), and all the adjacent positive and negative terminals would be connected in the same manner by wiring through the end caps 44. Of course, in any embodiment, the wiring would be connected in any other suitable manner.

Additionally, it may be desirable to combine both parallel and serial connected photovoltaic elements 40 to provide desired levels of both voltage and current. For example, the photovoltaic elements 40 could be divided into two halves each comprising elements 40 connected in serial as described above, and the outputs of the two halves may be connected in parallel. Such a parallel connection may be in the power output, and the output wiring from each half may be routed individually to the power output 46. Various combinations of serial and parallel connected photovoltaic elements 40 may be used, and this description is not intended to be limiting.

Additionally, the manner of establishing electrical connections may vary. For example, instead of wiring, integrated connectors may be built into the various components to facilitate such connections during assembly. Thus, the application is not limited to the examples mentioned herein.

As can be appreciated, the parking shelter provides the dual functionality of shading a vehicle or vehicles parked beneath it and generating electricity by its photovoltaic elements 40. Preferably, the elongated shading elements 16 are spaced apart in the range of 0.5 to 3 inches, and more preferably in the range of 0.75 to 2 inches. The preferred spacing is 1 inch. Preferably, the members have a horizontal width/diameter in the range of 3-6 inches, more preferably in the range of 4-5 inches, and the preferred width/diameter is 4.5 inches. These spacing ranges provide the proper balance between coverage of the elongated shading members 16, which contributes both to the shading and solar energy collection function of the shelter 10, and enabling airflow between the elongated shading members 16, which prevents the canopy structure 12 from being subject to significant lift or downward force during high wind conditions. Other canopy structure configurations may be used. For example, a construction where the shading members 16 are connected at other points, such as their ends, may be used. Likewise, a construction where the shading members are in a latticed or mesh-like construction transversing or intersecting each other at perpendicular or other angles, may be used. It is not necessary that the spacing between the shading members 16 be the same as disclosed.

The balance between shading/solar collection surface area and open areas for enabling airflow may also be expressed in terms of area density. For purposes of this application, area density is determined by the amount of surface area occupied by the shading members divided by the total surface area of the canopy structure itself (including its open spaces), with each area being determined when viewing the canopy structure in a top plan view (i.e., from directly above). This may be referred to as plan surface area. This form of expressing the balance between shading/solar collection surface area is better suited to latticed or mesh-like arrangement, where the open areas are smaller but more numerous. This density may be in the range of 3 to 6, and is preferably in the range of 4 to 5, with a preferred value of 4.5.

In the illustrated embodiment, the device has an overall plan area of about 97,500 square inches. Because of the rounded configuration of the member 16, the solar collection area is much larger, around 148,500 square inches. This is a significant increase over traditional flat panel canopy structures, while also overcoming the wind and precipitation issues involved with traditional flat panel structures.

The foregoing embodiments have been provided solely to illustrate the structural and functional principles of the present invention and are not intended to be limiting. To the contrary, the present invention is intended to encompass all modifications, substitutions, alterations, and equivalents within the spirit and scope of the following claims.

What is claimed:

1. An open-air parking shelter comprising:
    a canopy structure comprising a plurality of elongated shading members arranged in spaced apart relation, said spaced apart relation being such that airflow and precipitation is permitted between said elongated shading members;
    photovoltaic elements provided on said elongated shading members for receiving solar radiation and converting said solar radiation to electricity;
    a power output coupled to each of the photovoltaic elements for outputting the electricity converted by said photovoltaic elements;
    a support structure comprising a pillar extending below a central region of the canopy structure configured to support said canopy structure in spaced relation above a ground surface;
    wherein each of said plurality of elongated shading members has a rounded configuration;
    wherein said elongated shading members extend parallel to one another, and said support structure further comprises at least one transverse support beam extending perpendicularly to said elongated shading members,
    wherein the elongated shading members are mounted to said at least one transverse support beam, and the transverse support beam is supported by said pillar; and
    wherein each said transverse support beam has an undulated configuration such that the elongated shading members are arranged in an undulated configuration along each said transverse support beam.

2. An open-air parking shelter according to claim 1, wherein said photovoltaic elements are provided on each of said elongated shading members.

3. An open-air parking shelter according to claim 1, wherein said elongated shading members are formed of a transparent material, and said photovoltaic elements are received inside said elongated shading members.

4. An open-air parking shelter according to claim 2, wherein said elongated shading members are formed of a transparent material, and said photovoltaic elements are received inside said elongated shading members.

5. An open-air parking shelter according to claim 3, wherein said photovoltaic elements are thin films applied to upper interior surfaces of said elongated shading members.

6. An open-air parking shelter according to claim 4, wherein said photovoltaic elements are thin films applied to upper interior surfaces of said elongated shading members.

7. An open-air parking shelter according to claim 1, wherein said photovoltaic elements are provided on at least upper exterior surfaces of said elongated shading members.

8. An open-air parking shelter according to claim 7, wherein said photovoltaic elements are thin films applied on at least the upper exterior surfaces of said elongated shading members.

9. An open-air parking shelter according to claim 2, wherein said photovoltaic elements are provided on at least upper exterior surfaces of said elongated shading members.

10. An open-air parking shelter according to claim 9, wherein said photovoltaic elements are thin films applied on at least the upper exterior surfaces of said elongated shading members.

11. An open-air parking shelter according to claim 1, wherein said pillar extends vertically below the central region of said canopy structure.

12. An open-air parking shelter according to claim 1, wherein said at least one transverse support beam includes a pair of said transverse support beams spaced apart from one another, and wherein the elongated shading members are mounted to each of said pair of transverse support beams and each of the transverse support beams is supported by said pillar.

13. An open-air parking shelter according to claim 12, wherein said support structure further comprises a plurality of radial support arms, each radial support arm being connected at an inner end to a portion of the pillar, and at an outer end to a portion of an associated one of the transverse support beams.

14. An open-air parking shelter according to claim 13, wherein said radial support arms extend downwardly at an angle, the portion of the pillar at which the inner ends of the radial support arms connect being spaced below an upper end of the pillar.

15. An open-air parking shelter according to claim 14, wherein said radial support arms are lower radial support arms, and wherein said support structure further comprises upper radial support arms, each upper radial support arm being connected at an inner end to a top portion of the pillar, and at an outer end to a portion of an associated one of the transverse support beams.

16. An open-air parking shelter according to claim 15, wherein the outer ends of pairs of said upper and lower radial support arms are joined together for connection to the same portion of the associated one of the transverse support beams.

17. An open-air parking shelter according to claim 1, wherein the undulated configuration of each said transverse support beam has a downwardly facing concave portion and an upwardly facing concave portion.

18. An open-air parking shelter according to claim 17, wherein the downwardly facing concave portion is on a first side of the pillar, and the upwardly facing concave portion is on a second side of the pillar.

19. An open-air parking shelter according to claim 17, wherein the transverse support beam further comprises a curved configuration.

20. An open-air parking shelter according to claim 1, wherein the canopy structure is configured to position at least a portion of one of the plurality of elongated shading members offset from another of the plurality of elongated shading members relative to the ground surface.

21. An open-air parking, shelter according to claim 1, wherein the rounded configuration of one of the plurality of elongated shading members is adjacent to the rounded configuration of another of the plurality of elongated shading members in the spaced apart relation.

22. An open-air parking shelter according to claim 1, wherein the support structure comprises a curved configuration.

23. An open-air parking shelter according to claim 1 wherein the plurality of elongated shading members are spaced evenly in the canopy structure.

24. An open-air parking shelter according to claim 1 wherein the photovoltaic elements have a rounded configuration.

* * * * *